(12) United States Patent
Marshall

(10) Patent No.: US 9,802,336 B2
(45) Date of Patent: Oct. 31, 2017

(54) LIQUID GLAZE DIPPING APPARATUS AND METHODS FOR USING THE SAME

(71) Applicant: E. Clark Marshall, Provo, UT (US)

(72) Inventor: E. Clark Marshall, Provo, UT (US)

(73) Assignee: E. Clark Marshall, Provo, UT (US)

( * ) Notice: Subject to any disclaimer, the term of this patent is extended or adjusted under 35 U.S.C. 154(b) by 334 days.

(21) Appl. No.: 14/109,642

(22) Filed: Dec. 17, 2013

(65) Prior Publication Data
US 2014/0170329 A1 Jun. 19, 2014

Related U.S. Application Data

(60) Provisional application No. 61/738,793, filed on Dec. 18, 2012.

(51) Int. Cl.
| B28B 11/04 | (2006.01) |
| C04B 41/86 | (2006.01) |
| C04B 41/00 | (2006.01) |
| C04B 41/50 | (2006.01) |
| B05C 3/09 | (2006.01) |

(52) U.S. Cl.
CPC .............. B28B 11/045 (2013.01); B05C 3/09 (2013.01); C04B 41/009 (2013.01); C04B 41/5022 (2013.01); C04B 41/86 (2013.01)

(58) Field of Classification Search
None
See application file for complete search history.

(56) References Cited

U.S. PATENT DOCUMENTS

| 967,119 | A | * | 8/1910 | Farnham | ................. | B25B 1/103 |
| | | | | | | 269/153 |
| 3,583,694 | A | * | 6/1971 | Davies | ................... | F16B 2/065 |
| | | | | | | 269/249 |

* cited by examiner

*Primary Examiner* — Dah-Wei D Yuan
*Assistant Examiner* — Jethro M Pence
(74) *Attorney, Agent, or Firm* — David R. Conklin; Kirton McConkie

(57) ABSTRACT

A dipping apparatus is provided having a clamp pad and a support pad configured to clamp the external and internal surfaces of the base of a ceramic object to assist in dipping the ceramic object into a liquid glaze to achieve a blemish-free coating.

18 Claims, 5 Drawing Sheets

LIQUID GLAZE DIPPING APPARATUS AND METHODS FOR USING THE SAME

RELATED APPLICATIONS

This application claims the benefit of priority from U.S. Provisional Patent Application Ser. No. 61/738,793, filed Dec. 18, 2012 and titled LIQUID GLAZE DIPPING APPARATUS AND METHODS FOR USING THE SAME, which is incorporated herein in its entirety.

BACKGROUND OF THE INVENTION

The present invention relates generally to an apparatus configured to assist in glazing ceramic, stoneware, and porcelain articles and vessels. In particular, the present invention relates to an apparatus that achieves blemish-free glazing of ceramic articles by providing a clamp assembly that secures the ceramic article during the dipping and drying portions of the glazing process.

Glaze is a layer or coating of a vitreous substance which has been fused to a ceramic object through firing. Glaze can serve to color, decorate, strengthen and/or waterproof an item. Ceramic glazes generally contain silica to form glass, in combination with a mixture of metal oxides and other additives to provide color and proper flow characteristics to the glaze.

Liquid glazes, in the form of suspensions of various powdered minerals and metal oxides, may be applied by dipping the pieces directly into the glaze. Once dipped, the liquid glaze is allowed to dry before the firing process. During the firing process, the dried glaze melts to form a desired coating on the clay body.

An important aspect of some glazing processes is to ensure that the glaze is applied evenly to all of the decorative surfaces of the ceramic object. However, liquid glazes require that the ceramic piece be held by the artisan during the dipping process. In some instances, an artisan will hold the ceramic object with their fingers while dipping the piece into the glaze. In other instances, an artisan will use a pair of tongs to grip the ceramic object for dipping.

For both of these situations, the surface which is contacted or held either received no glaze, or receives some glaze during the firing process as the glaze is liquefied and flows onto the uncoated surfaces. Thus, the final glaze coating on the ceramic object contains blemishes where the object was held during the dipping process.

Furthermore, in some instances the artisan will dip the upper have of the vessel by holding the piece by the lower half. Once the liquid glaze has set, the artisan suspends the piece from the inside and dips the lower half of the vessel up to the line established by the first dip. The conjuncture of the two separate dips results invariably in a thickened layer of glaze.

In some instances, a potter will design a vessel around the conjuncture line to allow for the thickened band of glaze. For example, a potter may put a line on the shoulder of the piece to serve as a physical depth marker for dipping. The potter anticipates that the band of thickened glaze created on the surface of the piece will hide the line or depth marker created by the potter when the vessel is dipped using this method. As a result, the fired piece appears to be free of blemishes.

A further method of glazing available to artisans or potters is that of spraying. The interior of the ceramic vessel is first coated with a layer of glaze which is allowed to dry. The vessel is then placed in a spray booth on a rotating surface. Glaze is pneumatically pressurized and sprayed onto the vessel in a slow consistent manner leaving a mostly even coating of glaze on the surface of the piece. Hasty spraying can leave drips, and the artisan has no fast and sure way to understand how thick the glaze has been applied over the surface of the piece. The glaze will generally be thicker in the broader surfaces of the ceramic vessel which are exposed to increase spraying. The cost of this process is exorbitant due to the required materials and equipment. Furthermore, the booths, spraying apparatuses, and air filtration systems for the booths require extensive maintenance and cleaning, thereby further complicating the process.

While methods exist for applying liquid glaze to a vessel, challenges still remain. Accordingly, there is a need for an improved apparatus and method for applying liquid glaze to a ceramic object to obtain a blemish-free glaze coating. Such an apparatus and method is disclosed herein.

BRIEF SUMMARY OF THE INVENTION

The present invention relates generally to an apparatus configured to assist in glazing ceramic, stoneware, and porcelain articles and vessels. In particular, the present invention relates to an apparatus that achieves blemish-free glazing of ceramic articles by providing a clamp assembly that secures the ceramic article during the dipping and drying portions of the glazing process.

Some implementations of the present invention include a dipping apparatus which includes a base having a plurality of stanchions or vertical supports that surround a centrally-located support post. The support post includes a support pad that is configured to receive and support the inner surface of a base portion of a ceramic vessel. The dipping apparatus further includes a clamping assembly that is coupled to the base via the stanchions or vertical supports. In some instances, the clamping assembly is hingedly coupled to one or more of the stanchions. The clamping assembly may further be temporarily secured to the stanchions via a clasp or other similar device, thereby providing a closed configuration for the apparatus.

The clamping assembly further includes a clamp having a clamp pad that is in approximate alignment with the support pad when the apparatus is in a closed configuration. The clamp pad is coupled to a clamp rod that is moved in vertical up and down directions as the clamp is actuated. The clamp rod is moved to adjust the distance between the support pad and the clamp pad. In some instances, a ceramic object is clamped between the support pad and the clamp pad as the clamp is actuated while the apparatus is in the closed configuration.

A ceramic vessel is secured in the dipping apparatus by inverting the ceramic vessel and lowering the opening of the vessel over the support pad. The vessel is lowered over the support post until inner surface of the vessel's base rests on the support pad. The clamping assembly is then closed and secured to the vertical supports. The clamp of the clamping assembly is then actuated to cause the clamp pad to contact the outer surface of the base of the ceramic vessel. Additional clamping pressure is applied by the clamp to securing clamp the base of the ceramic vessel between the support pad and the clamp pad. The vessel is removed from the dipping apparatus by releasing the clamp and detaching the clamping apparatus from the stanchions. The clamping apparatus is then either removed from the base, or pivoted into an open position thereby permitting removal of the vessel.

BRIEF DESCRIPTION OF THE SEVERAL VIEWS OF THE DRAWINGS

In order that the above-recited and other features and advantages of the invention are obtained and will be readily understood, a more particular description of the invention briefly described above will be rendered by reference to specific embodiments thereof, which are illustrated in the appended drawings. These drawings depict only typical embodiments of the invention and are not therefore to be considered to limit the scope of the invention.

DETAILED DESCRIPTION OF THE INVENTION

The presently preferred embodiments of the described invention will be best understood by reference to the Figures, wherein like reference numbers indicate identical or functionally similar elements. It will be readily understood that the components of the present invention, as generally described and illustrated in the Figures, could be arranged and designed in a wide variety of different configurations. Thus, the following more detailed description, as represented in FIGS. 1 through 5, is not intended to limit the scope of the invention as claimed, but is merely representative of some presently preferred embodiments of the invention.

Figure 1:
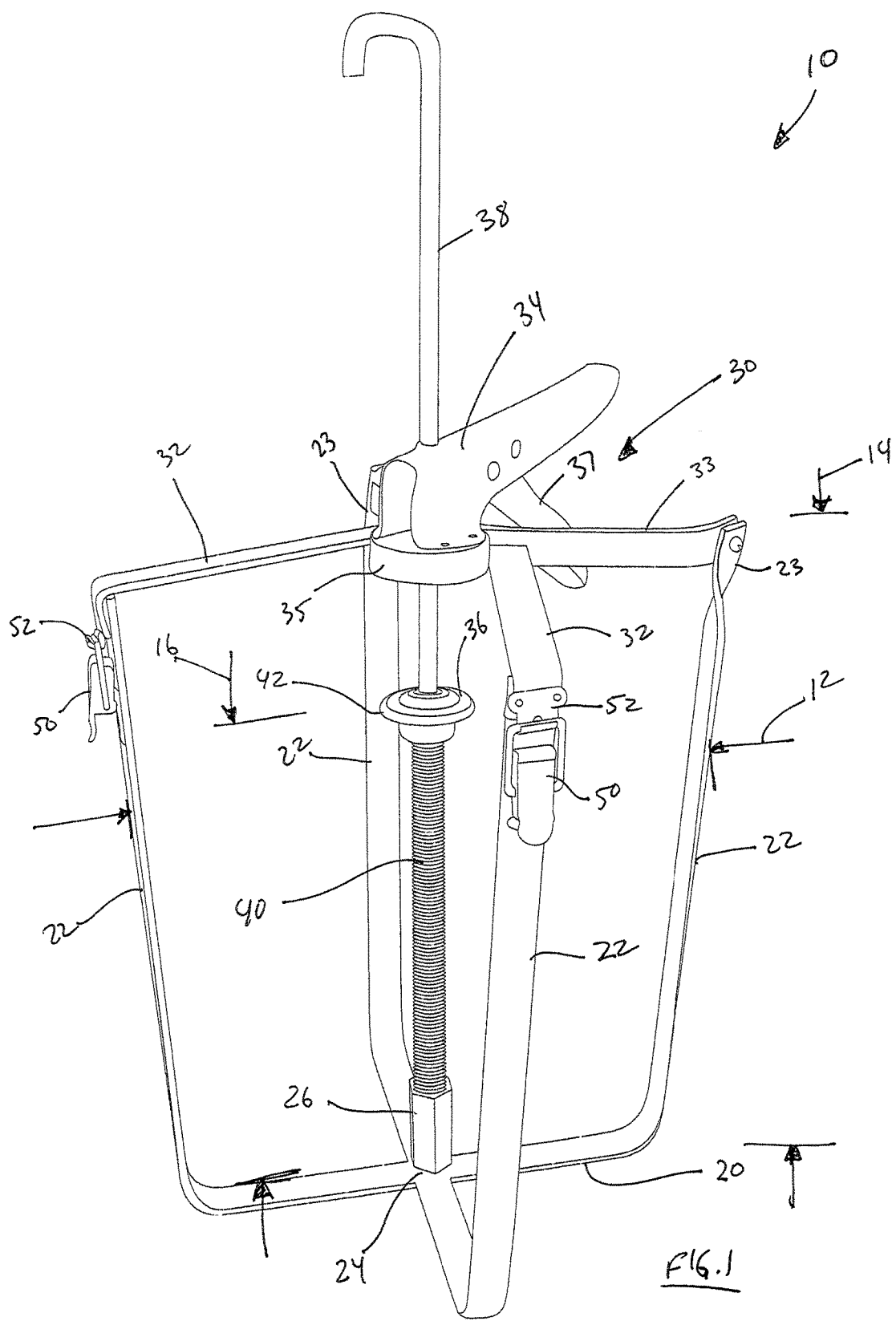
FIG. 1 is a perspective view of a dipping apparatus in a closed configuration in accordance with a representative embodiment of the present invention.

The present disclosure describes systems and methods related to glazing a ceramic object with a liquid glaze to provide a blemish-free coating. In some instances, the present invention includes a dipping apparatus 10, as shown in FIG. 1. Dipping apparatus 10 may comprise any material or combination of materials that is compatible for use with liquid glaze. For example, in some embodiments dipping apparatus 10 comprises a metallic material, such as steel or aluminum. In other embodiments, dipping apparatus 10 comprises a polymer material, such as polycarbonate, polyvinylchloride, or polypropylene. Dipping apparatus 10 may further comprises a combination of compatible materials.

Dipping apparatus 10 generally comprises a base 20 that is coupled to a clamp assembly 30. In some instances, base 20 comprises two or more stanchions 22 which extend upwardly from base 20. Base 20 may include any number of stanchions 22. Generally, stanchions 22 are evenly spaced from one another around a center 24 of base 20. For example, where dipping apparatus 10 comprises four stanchions 22, stanchions 22 are positioned at approximately 90° from one another. Where dipping apparatus 10 comprises three stanchions (not shown), the stanchions may be positioned at approximately 120° from one another.

In some instances, stanchions 22 form a cage-like structure abound center 24 of base 20. The width 12 and height 14 of stanchions 22 may be selected to accommodate the dimensions of any ceramic vessel for dipping. Generally, width 12 and height 14 are selected to be greater than a width and height of a ceramic vessel intended to be secured in dipping apparatus 10. In some embodiments, a set of dipping apparatuses is provided which includes a plurality of dipping apparatus, each dipping apparatus having a different width and height to accommodate a variety of ceramic vessels. In other embodiments, base 20 is modular whereby stanchions 22 may be interchanged with various other stanchions having different widths and heights.

Base 20 further includes a support post 40 which is secured to base 20 at center 24. In some embodiments, support post 40 comprises a threaded shaft having a first end comprising a support pad 42, and a second end that is secured to base 20. In some embodiments, support post 40 is secured to center 24 via a coupler 26. Coupler 26 may include a set of threads configured to threadedly receive support post 40. In some instances, a threaded connection between support post 40 and coupler 26 permits vertical adjustment of support pad 42. In other embodiments, support post 40 comprises a non-threaded shaft that is fixedly secured to center 24, such as by a welded joint.

A ceramic vessel is supported by support post 40 by first inverting the ceramic vessel, and then inserting support pad 42 through an opening of the vessel such that the bottom, inner surface of the vessel rests on support pad 42. Thus, the height 16 of support pad 42 is set to be greater than the depth of the inner surface of the ceramic vessel, or the distance from the bottom, inner surface of the vessel to the rim of the opening of the vessel. Accordingly, when the ceramic vessel is supported by support post 40 and support pad 42, the rim of the vessel is suspended above base 20.

Figure 2:
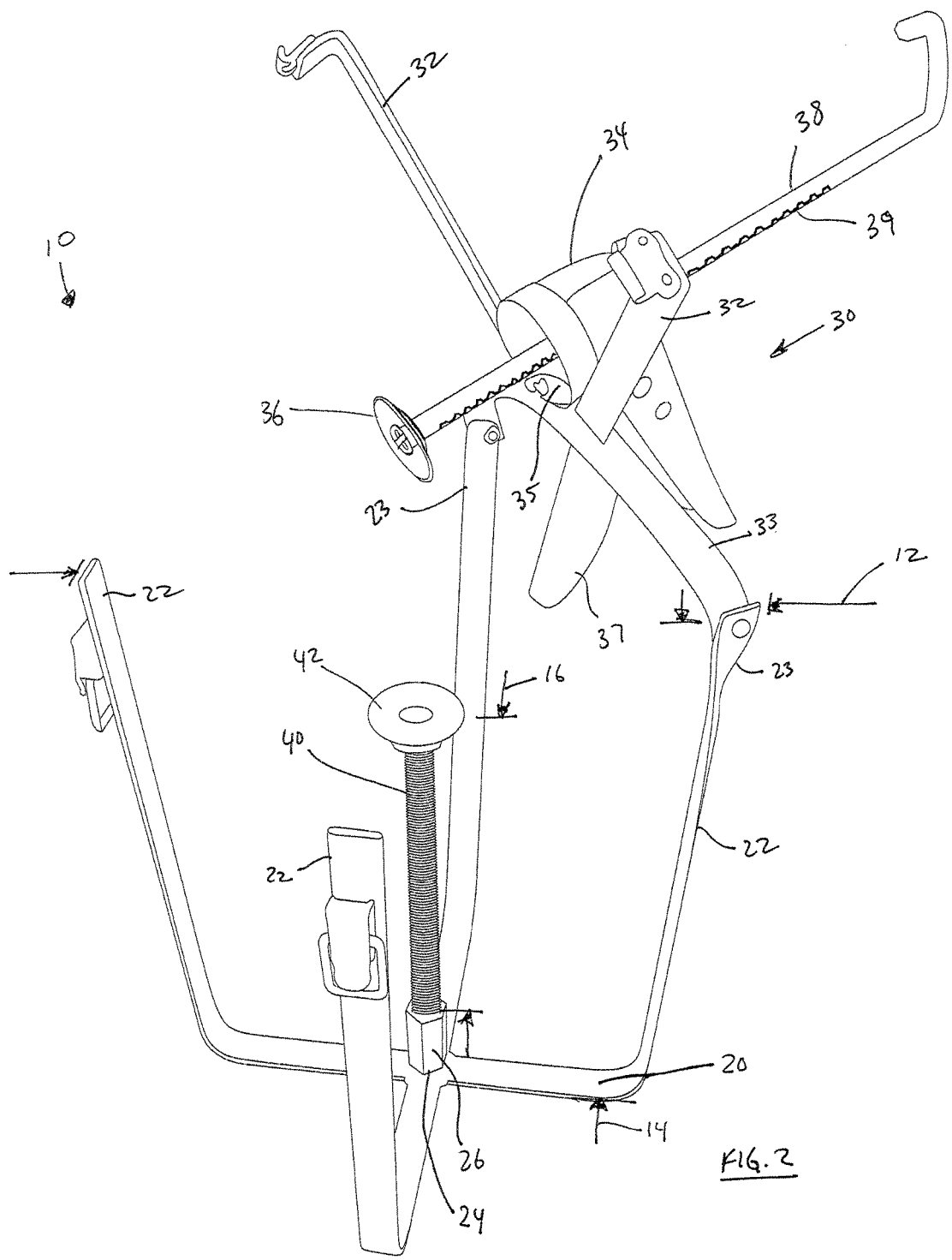
FIG. 2 is a perspective view of a dipping apparatus in an open configuration in accordance with a representative embodiment of the present invention.

Dipping apparatus 10 further includes a clamping assembly 30. In some embodiments, clamping assembly 30 is hingedly coupled to stanchions 22. As such, clamping assembly 30 may pivoted into an open position, as shown in FIG. 2. With continued reference to FIGS. 1 and 2, clamping assembly 30 comprises a plurality of clamp supports 32 which are configured to coupled to stanchions 22. In some instances, clamping assembly 30 comprises a clamp support 33 having two ends, each end being hingedly coupled to two adjacent stanchions 23. When in the closed configuration, the free or unhinged clamp supports 32 are aligned with the free or unhinged stanchions 22, as shown in FIG. 1. Unhinged stanchions 22 may further include a clasp 50 that is configured to receive and secure a hook 52 that comprises an end of free clamp supports 32. Thus, when in the closed configuration, clamping assembly 30 is securely attached to base 20 via stanchions 22.

Clamping assembly 30 further comprises a clamp 34. Clamp 34 may include any type or kind of clamp known in the art. Generally, clamp 34 comprises a body 35 that is fixedly secured to hinged clamp support 33, such as by a welded joint. Clamp supports 32 may further be fixedly secured to hinged clamp support 33, such as by welded joints.

Clamp 34 is coupled to hinged clamp support 33 such that a clamping pad 36 of clamp 34 is in alignment with support pad 42 when in the closed configuration. In some embodiments, clamp 34 further comprises a clamp rod 38 that is coupled to clamp pad 36. Clamp rod 38 is configured to adjust clamp pad 36 vertically with respect to clamp body 35 and support pad 42. In some instances, clamp 34 comprises a ratchet clamp that is configured to grip and move rod 38 in up and down vertical directions via a plurality of teeth 39. Rod 38 is moved as handle 37 of clamp 34 is actuated. In other instances, clamp 34 comprises at least one of a friction clamp, a screw clamp, a speed clamp, a toggle clamp, a magnetic clamp, a handscrew, and other known clamping devices.

Figure 3:
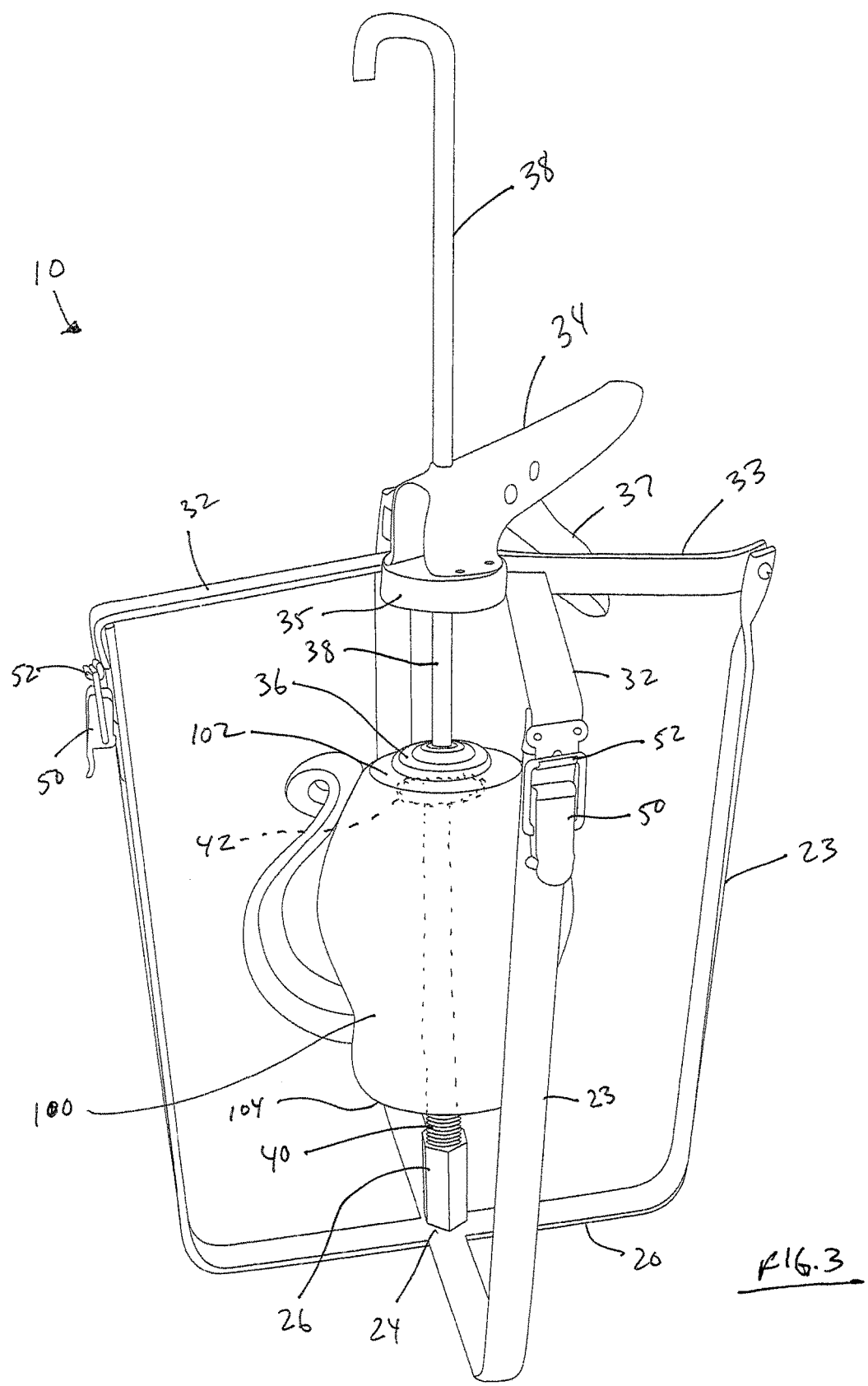
FIG. 3 is a perspective view of a dipping apparatus in a closed configuration and securing a vessel in accordance with a representative embodiment of the present invention.

Referring now to FIG. 3, a ceramic vessel 100 is secured in dipping apparatus 10. Ceramic vessel 100 may include any material or combination of materials for which it may be desired to apply a liquid glaze coating by dipping. In some instances, ceramic vessel 100 comprises a base 102, and an opening 104 that is positioned opposite base 102. Vessel 100 is secured in dipping apparatus 10 as vessel 100 is inverted and support pad 42 is inserted into opening 104. Vessel 100 is lowered over support post 40 until the interior surface of base 104 rests on and is supported by support pad 42. Clamp assembly 30 is then pivoted into a closed position and clamp supports 32 are secured to stanchions 22 via clasps 50.

The position of vessel 100 is secured by actuating clamp 34 to lower clamp pad 36 onto base 102 of vessel 100. In some embodiments, handle 37 is gripped and released to incrementally lower clamp pad 36 onto base 102. Clamp 34 is adjusted so that base 102 of vessel 100 is pinched between clamp pad 36 and support pad 42. Once secured, vessel 100 may be coated by lowering base 20 and stanchions 22 into a container of liquid glaze. Vessel 100 and dipping apparatus 10 are then removed from the glaze and allowed to dry. Once dry, vessel 100 is removed from dipping apparatus 10 and may be fired.

In some instances, it may be desirable to prevent liquid glaze from being applied to base 102 of vessel 100. Accordingly, in some embodiments clamp pad 36 comprises a diameter configured to substantially block base 102 from being coated with liquid glaze during the dipping process. In some instances, clamp pad 36 comprises a rubber material that provides a fluid tight seal between clamp pad 36 and base 102. The rubber material may also provide a secure grip between clamp pad 36 and base 102, as well as prevent damage to base 102 when clamping pressure is applied by clamp 34. Further, in some embodiments support pad 42 may comprise a rubber material to prevent damage to interior surfaces of vessel 100 when clamping pressure is applied.

Figure 4B:
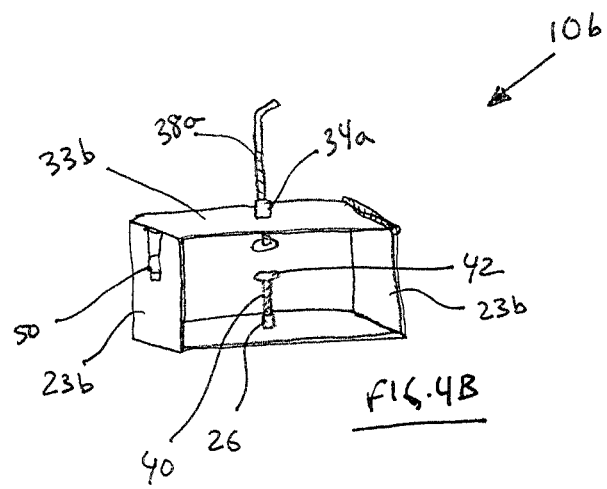
FIG. 4, shown in parts A and B, shows various other configurations of dipping apparatuses in accordance with various representative embodiments of the present invention.
Figure 4A:
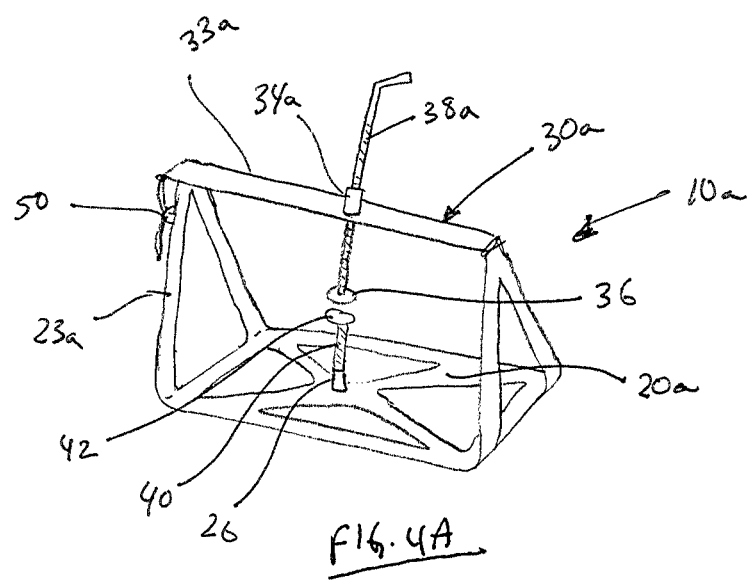

Dipping apparatuses of the present invention may comprise any size, shape, structure, or configuration to accommodate any ceramic object for dipping. For example, in some embodiments dipping apparatus 10a comprises an A-frame configuration, wherein clamping assembly 30a comprises a single clamp support, as shown in FIG. 4A. In some instances, clamp 34a comprises a threaded coupler configured to receive threaded clamp rod 38a. Base 20a and A-frame stanchions 23a may further include various cutouts to provide a lightweight dipping apparatus. In other embodiments, dipping apparatus 10b comprises a box configuration, as shown in FIG. 4B.

Figure 5:
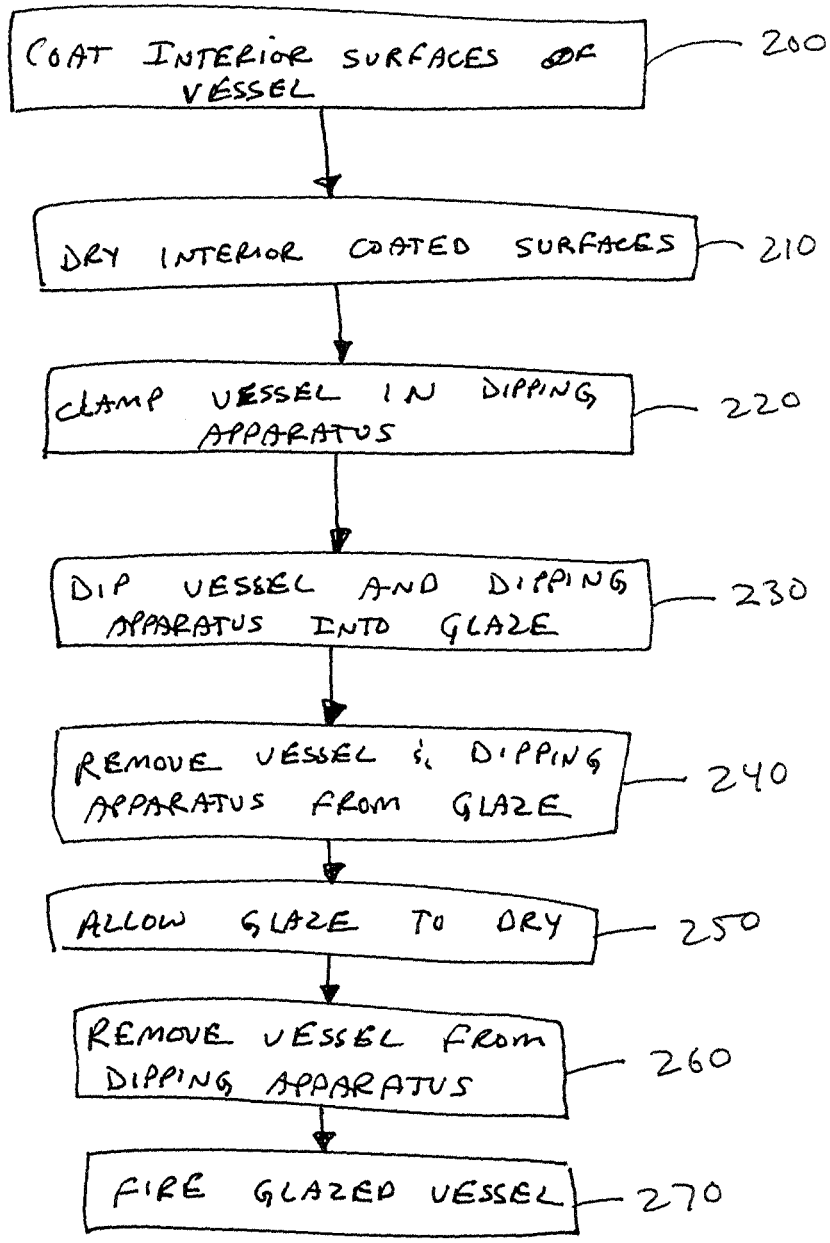
FIG. 5 shows a method of coating a ceramic vessel with a liquid glaze by using a dipping apparatus in accordance with a representative embodiment of the present invention.

Referring now to FIG. 5, a method for glazing a ceramic object via a dipping apparatus in accordance with the present invention is shown. In some instances, the interior surfaces of a vessel are first coated with a liquid glaze, such as by dipping (at step 200). The interior surfaces are then allowed to dry (at step 210). The partially-glazed vessel is then clamped into the dipping device, as described above (at step 220). The vessel and dipping apparatus are then dipped into a container of liquid glaze to coat the outer surface of the vessel (at step 230). The vessel and dipping apparatus are then removed from the container of liquid glaze (at step 240). The glaze coating on the outer surface of the vessel is then allowed to dry while the vessel remains clamped in the dipping apparatus (at step 250). Once dried, the coated vessel is removed from the dipping apparatus (at step 260). The glazed vessel may then be fired or undergo additional preparation (at step 270).

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. A dipping apparatus, comprising:
   a base;
   a support post extending outwardly from the base, and comprising a free end and a connected end opposite the free end, wherein the free end comprises a support pad, wherein the connected end is coupled with the base;
   a first stanchion and a second stanchion extending outwardly from the base; and
   a clamping assembly having a first end pivotally coupled to the first stanchion, and a second end selectively coupled to the second stanchion, the clamping assembly comprising a clamp having a clamp pad in alignment with the support pad when the clamping assembly is in a closed configuration.

2. The apparatus of claim 1, wherein the support post is threadedly coupled to the base to allow a distance between the support pad and the base to be adjusted.

3. The apparatus of claim 1, further comprising a plurality of stanchions.

4. The apparatus of claim 1, wherein the connection between the first end and the first stanchion permits the clamping assembly to pivot between an opened configuration and the closed configuration.

5. The apparatus of claim 4, further comprising a latch provided on at least one of the second end and the second stanchion, wherein the latch is engaged to maintain the closed configuration of the clamping assembly.

6. The apparatus of claim 1, wherein the clamp pad is adjustably coupled to a body of the clamping assembly via a clamp rod.

7. The apparatus of claim 6, wherein the clamp rod is adjustably coupled to the body.

8. The apparatus of claim 7, wherein the clamp is a ratchet clamp.

9. The apparatus of claim 7, wherein the clamp is selected from a group consisting of a friction clamp, a screw clamp, a speed clamp, a toggle clamp, a magnetic clamp, a handscrew, and a ratchet clamp.

10. The apparatus of claim 1, wherein the clamp pad forms a fluid tight seal between the clamp pad and an object clamped between the clamp pad and the support pad.

11. The apparatus of claim 10, wherein the clamp pad comprises a rubber material.

12. The apparatus of claim 1, wherein the support pad comprises a rubber material.

13. The apparatus of claim 1, wherein the one or more stanchions comprises two or more stanchions.

14. The apparatus of claim 1, wherein the base comprises an A-frame configuration.

15. A dipping apparatus, comprising:
   a base;

a support post extending outwardly from the base, wherein the support post comprises a support pad;

a first stanchion and a second stanchion extending outwardly from the base and spaced around the support post; and a clamping assembly having a first end pivotally coupled to the first stanchion, and a second end selectively coupled to the second stanchion, the clamping assembly comprising a clamp having a clamp pad in alignment with the support pad when the clamping assembly is in a closed configuration.

16. The dipping apparatus of claim 15, wherein the support post is disposed at a center of the base.

17. The dipping apparatus of claim 15, further comprising a plurality of stanchions evenly spaced around the support post.

18. The apparatus of claim 15, wherein the hinged coupling connection between the first end and the first stanchion clamping assembly and the plurality of stanchions permits the clamping assembly to move between an opened configuration and the closed configuration.

* * * * *